United States Patent
Keskar (10) Patent No.: US 11,157,538 B2
(45) Date of Patent: *Oct. 26, 2021

(54) SYSTEM AND METHOD FOR GENERATING SUMMARY OF RESEARCH DOCUMENT

(71) Applicant: Innoplexus AG, Eschborn (DE)

(72) Inventor: Abhijit Keskar, Pune (IN)

(73) Assignee: Innoplexus AG, Eschborn (DE)

( * ) Notice: Subject to any disclaimer, the term of this patent is extended or adjusted under 35 U.S.C. 154(b) by 265 days.

This patent is subject to a terminal disclaimer.

(21) Appl. No.: 16/145,670

(22) Filed: Sep. 28, 2018

(65) Prior Publication Data

US 2019/0332719 A1 Oct. 31, 2019

Related U.S. Application Data

(60) Provisional application No. 62/664,399, filed on Apr. 30, 2018.

(51) Int. Cl.
*G06F 7/00* (2006.01)
*G06F 16/34* (2019.01)
(Continued)

(52) U.S. Cl.
CPC .......... *G06F 16/345* (2019.01); *G06F 16/313* (2019.01); *G06F 16/38* (2019.01); *G06F 40/247* (2020.01); *G06N 20/00* (2019.01)

(58) Field of Classification Search
CPC ............ G06F 16/374; G06F 16/24578; G06F 16/9535; G06F 16/313
See application file for complete search history.

(56) References Cited

U.S. PATENT DOCUMENTS 6,675,159 B1 * 1/2004 Lin ...................... G06F 40/253
8,856,096 B2 * 10/2014 Marchisio ............... G06F 16/36
707/706

(Continued)

FOREIGN PATENT DOCUMENTS

WO WO2002027538 * 4/2002

OTHER PUBLICATIONS

WO2002027538A2.*
Context based Indexing in Search Engines using Ontology; International Journal of Computer Applications; 2010.*

*Primary Examiner* — Daniel A Kuddus
(74) *Attorney, Agent, or Firm* — Ziegler IP Law Group, LLC (57) ABSTRACT

Disclosed is a system for generating summary of at least one research document. The system comprising computing device associated with an entity, data repository comprising ontological database and synonym database and server arrangement communicably coupled via one or more data communication networks with the computing device and the data repository. The server arrangement is configured to acquire information included in at least one research document, analyze information using ontological database and synonym database to identify set of keywords corresponding to at least one research document, assign first score to each of the keywords based on document-centric property, assign second score to one or more relationships between the keywords based on relationship-centric property and generate summary for at least one research document. Summary comprises: first portion generated based upon informatory data, second portion generated based on keywords and third portion generated using machine learning algorithm based on first score of keywords.

9 Claims, 2 Drawing Sheets

(51) Int. Cl.
  *G06N 20/00* (2019.01)
  *G06F 16/38* (2019.01)
  *G06F 16/31* (2019.01)
  *G06F 40/247* (2020.01)

(56) References Cited

U.S. PATENT DOCUMENTS

| | | | |
|---|---|---|---|
| 9,378,285 B2* | 6/2016 | Marchisio | G06F 16/3344 |
| 9,747,390 B2* | 8/2017 | Cooper | G06F 40/242 |
| 2003/0177112 A1* | 9/2003 | Gardner | G16B 50/00 |
| 2005/0267871 A1* | 12/2005 | Marchisio | G06F 16/3338 |
| 2006/0235843 A1* | 10/2006 | Musgrove | G06F 16/3344 |
| 2007/0011154 A1* | 1/2007 | Musgrove | G06F 40/30 |
| 2007/0156669 A1* | 7/2007 | Marchisio | G06F 16/93 |
| 2014/0074826 A1* | 3/2014 | Cooper | G06F 16/3338 707/722 |
| 2015/0310104 A1* | 10/2015 | Marchisio | G06F 16/36 707/722 |
| 2016/0196340 A1* | 7/2016 | Cheslow | G06F 16/243 707/728 |

* cited by examiner

SYSTEM AND METHOD FOR GENERATING SUMMARY OF RESEARCH DOCUMENT

CROSS-REFERENCE TO RELATED APPLICATIONS

This is a non-provisional patent application based upon a U.S. provisional patent application No. 62/664,399 as filed on Apr. 30, 2018, and claims priority under 35 U.S.C. 199(e).

TECHNICAL FIELD

The present disclosure relates generally to systems for processing documents pertaining to a research field, and more specifically, to systems for generating summary of research documents. Moreover, the present disclosure relates to methods of generating summary of research documents.

BACKGROUND

Typically, research work includes documenting the knowledge acquired (about subjects, aspects or facts) while solving a new or existing problem. Generally, documenting includes recording facts, surveys and figures acquired during the research work on a formal document. Currently, researchers have started sharing their research document (i.e. the formal document containing the research work) with an interested entity for example, university, government labs, private companies and the like.

Usually, sharing of research documents via the Internet is facilitated though a computing platform. Notably, the researcher uploading the research document also uploads a manually written summary of the research work along with the research document. Typically, the summary presents concise key features which are cited in the research document. Thus, the summary enables the interested entity to determine relevance of the research document for themselves.

However, conventional techniques used for sharing the research document presents several problems. Firstly, it provides an inadequate summarization of the document. Often, the manually written summary of the research document fails to include keywords that can be used to search the research document over the Internet. Consequently, absence of the keywords makes the process of searching for the research document cumbersome and inefficient. Additionally, absence of keywords can also lead to wrong interpretation of the summary. Moreover, during online search, lack of keywords frequently blocks citation of the research document therein. Secondly, it permits unauthorized access of the research documents. For example, a researcher uploading a research document to an available computing platform may provide limited access to the research document before exchange of a remuneration and may provide complete access to the research document upon receiving the remuneration. However, the available computing platforms do not support such hierarchical architecture.

Therefore, in light of the foregoing discussion, there exists a need to overcome the aforementioned drawbacks associated with the conventional techniques of sharing research documents on the computing platforms.

SUMMARY

The present disclosure seeks to provide a system for generating a summary of at least one research document. The present disclosure also seeks to provide a method for generating a summary of at least one research document. The present disclosure seeks to provide a solution to the existing problem of ineffective summarization of the research document. An aim of the present disclosure is to provide a solution that overcomes at least partially the problems encountered in prior art, and provide an interactive, dynamic and secure platform for generating summary of research document.

In one aspect, an embodiment of the present disclosure provides a system for generating a summary of at least one research document, the system comprising:
a computing device associated with an entity, wherein the computing device, comprises a computer readable program code, configured to facilitate:
uploading the at least one research document,
acquiring informatory data related to the at least one research document, and
preprocessing the at least one research document to extract information included therein;
a data repository comprising an ontological database and a synonym database; and
a server arrangement communicably coupled via one or more data communication networks with the computing device and the data repository, the server arrangement configured to:
acquire, from the computing device, the information included in the at least one research document,
analyze, the information using the ontological database and the synonym database to identify a set of keywords corresponding to the at least one research document,
assign a first score to each of the keywords based on a document-centric property,
assign a second score to one or more relationships between the keywords based on a relationship-centric property, and
generate the summary for the at least one research document, wherein the summary comprises:
a first portion generated based upon the informatory data,
a second portion generated based on the keywords in the one or more relationships having the second score below a predefined threshold, and
a third portion generated, using a machine learning algorithm, based on the first score of the keywords.

In another aspect, an embodiment of the present disclosure provides a method for generating a summary of at least one research document, wherein the method is implemented using a system comprising:
a computing device associated with an entity, wherein the computing device, comprises a computer readable program code, configured to facilitate:
uploading the at least one research document,
acquiring informatory data related to the at least one research document, and
preprocessing the at least one research document to extract information included therein;
a data repository comprising an ontological database and a synonym database; and
a server arrangement communicably coupled via one or more data communication networks with the computing device and the data repository, wherein the method comprises:
acquire, from the computing device, the information included in the at least one research document, analyzing, the information using the ontological database and the synonym database to identify a set of keywords corresponding to the at least one research document, assigning a first score to each of the keywords based on a document-centric property, assigning a second score to one or more relationships between the keywords based on a relationship-centric property, and generating the summary for the at least one research document, wherein the summary comprises:
   a first portion generated based upon the informatory data,
   a second portion generated based on the keywords in the one or more relationships having the second score below a predefined threshold, and
   a third portion generated, using a machine learning algorithm, based on the first score of the keywords.

Embodiments of the present disclosure substantially eliminate or at least partially address the aforementioned problems in the prior art, and enables efficient generation of summary for research document, wherein a dynamic and secure system of computing platform is enabled that can increase security during transfer of research documents, reduce overall computation time of the system and lessen manual intervention. Thus, energy dissipation in the system is cut down and in operation, temporal responsiveness is improved.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a system for generating a summary of at least one research document, the system comprising:

a computing device associated with an entity, wherein the computing device, comprises a computer readable program code, configured to facilitate:
   uploading the at least one research document,
   acquiring informatory data related to the at least one research document, and
   preprocessing the at least one research document to extract information included therein;

a data repository comprising an ontological database and a synonym database; and a server arrangement communicably coupled via one or more data communication networks with the computing device and the data repository, the server arrangement configured to:
   acquire, from the computing device, the information included in the at least one research document,
   analyze, the information using the ontological database and the synonym database to identify a set of keywords corresponding to the at least one research document,
   assign a first score to each of the keywords based on a document-centric property,
   assign a second score to one or more relationships between the keywords based on a relationship-centric property, and
   generate the summary for the at least one research document, wherein the summary comprises:
      a first portion generated based upon the informatory data,
      a second portion generated based on the keywords in the one or more relationships having the second score below a predefined threshold, and
      a third portion generated, using a machine learning algorithm, based on the first score of the keywords.

In another aspect, an embodiment of the present disclosure provides a method for generating a summary of at least one research document, wherein the method is implemented using a system comprising:

a computing device associated with an entity, wherein the computing device, comprises a computer readable program code, configured to facilitate:
   uploading the at least one research document,
   acquiring informatory data related to the at least one research document, and
   preprocessing the at least one research document to extract information included therein;

a data repository comprising an ontological database and a synonym database; and a server arrangement communicably coupled via one or more data communication networks with the computing device and the data repository, wherein the method comprises:

acquiring, from the computing device, the information included in the at least one research document, analyzing, the information using the ontological database and the synonym database to identify a set of keywords corresponding to the at least one research document, assigning a first score to each of the keywords based on a document-centric property, assigning a second score to one or more relationships between the keywords based on a relationship-centric property, and generating the summary for the at least one research document, wherein the summary comprises:
  a first portion generated based upon the informatory data,
  a second portion generated based on the keywords in the one or more relationships having the second score below a predefined threshold, and
  a third portion generated, using a machine learning algorithm, based on the first score of the keywords.

The present disclosure provides a system and a method for generating a summary of at least one research document. The computing device associated with an entity enables the generation of summary for the at least one research document in a secure manner. The computing device preprocesses the at least one research document to extract information from therein, and shares with the server without sharing the document itself. Beneficially, the at least one research document remains stored in the computing device providing lesser avenues for unauthorized access to the at least one research document.

The system provides secure transmission for the extracted information between the computing device and the server arrangement that can be monitored. Therefore, such secure transmission enables the entity to share information with the server arrangement which it may or may not trust. Additionally, the system uses a set of keywords corresponding to the at least one research document for generating the summary. Furthermore, the keywords are selected based on the document-centric property of the keywords, and one or more relationships within the keywords. Moreover, the one or more relationships within the keywords is evaluated based on the relationship-centric property of the relationships. Therefore, the keywords used to generate the summary of the documents are operable to represent the concept of the invention.

Moreover, the system is configured to include the informatory data (namely the hypotheses) provided by the entity related to the at least one research document to configure a portion (namely the first portion) of the summary. Therefore, the summary includes the information related to the research document that the entity provides to describe the research document. Furthermore, another portion (namely the second portion) of the summary is generated based on the keywords in the one or more relationships having the second score that is below the predefined threshold. Therefore, the summary generated is operable to convey a concept of the research document without disclosing any proprietary information included by the entity in the at least one research document.

In addition, yet another portion (namely the third portion) of the summary is generated using the machine learning algorithm. The machine learning algorithm is configured to consider the first score of the keywords to construct one or more sentences in the third portion of the summary. Therefore, the machine learning algorithm is configured to use keywords that are relevant to the at least one research document.

As mentioned previously, the system for generating the summary of at least one research document refers to a collection of one or more programmable and non-programmable components that are interconnected therein. Furthermore, one or more programmable and non-programmable components are configured to acquire, compare, process data included in research documents, and subsequently generate a concise text corpus (namely summary) from the data included in research documents. Throughout the present disclosure, the term "research document" relates to a digital product that enables an entity to store, edit and share information related to an experiment and/or research in the digital form using a computer program or a product. It will be appreciated that the information relates to words, terms, abbreviations, sentences and the like, used to form the at least one research document. Furthermore, the research document can include digital files that are configured to store any form of textual and/or multimedia data. Additionally, the digital files forming the research document can be stored in various formats. Examples of such formats can include .doc, .pptx, .pdf, .jpg, .png, .xlsx, .pot, and the like. Optionally, the research document can include one or more digital files storing information. It will be appreciated that entity relates to any user including a person (i.e., human being), an organization (i.e. a company, university, and the like), or a virtual personal assistant (an autonomous program or a bot) using the system described herein.

Furthermore, throughout the present disclosure, the term "summary" relates to brief electronic content generated from the at least one research document to describe the information stored in the at least one research document. The summary may be generated in the form of documents, files, scripts, codes, executable programs, web pages or any other digital data that can be transmitted via a network (such as the Internet). The summary can be formed of one or more data (such as words and/or sentence) included in the at least one research document. Furthermore, the summary can be formed in a specific structure wherein the one or more data of the at least one research document is arranged in a specific manner. For example, a given data (such as a sentence) of the at least one research document may be positioned at the starting of the summary. In another example, a collection of data (such as one or more words) of the at least one research document may be arranged after a first sentence of the summary.

Optionally, the summary can be a web-content that can be accessed by the programmable and/or non-programmable components of the system whilst browsing the web. Furthermore, the web-content including the summary is associated with a webpage that can include various web specific contents, such as, HTML content.

The system comprises the computing device associated with the entity. Throughout the present disclosure, the term "computing device" relates to an electronic device associated with the system that enables the entity to perform one or more tasks associated with the aforementioned system by using the computing device. Furthermore, the computing device is intended to be broadly interpreted to include any electronic device that may be used for voice and/or data communication over a wireless communication network. Examples of the computing device include but are not limited to, cellular phones, personal digital assistants (PDAs), laptop computers, personal computers, etc. Moreover, the computing device may alternatively be referred to as a mobile station, a mobile terminal, a subscriber station, a remote station, a user terminal, a terminal, a subscriber unit, etc. Additionally, the computing device includes a casing, a memory, a processor, a network interface card, a microphone, a speaker, a keypad, and a display. Moreover, the computing device is to be construed broadly, to encompass a variety of different types of mobile stations, subscriber stations or, more generally, communication devices, including examples such as a combination of a data card inserted in a laptop.

As mentioned previously, the computing device comprises the computer readable program code. Throughout the present disclosure, the term "computer readable program code" relates to collection or set of instructions executable by the computing device so as to configure the computing device to perform one or more tasks associated with the aforementioned system. Additionally, the computer readable program code is intended to encompass such instructions stored in storage medium such as RAM, a hard disk, optical disk, or so forth, and is also intended to encompass so-called "firmware" that is software stored on a ROM or so forth. Optionally, the computer readable program code refers to software application. Such computer readable program code is organized in various ways, for example the process includes software components organized as libraries, Internet-based programs stored on a remote server or so forth, source code, interpretive code, object code, directly executable code, and so forth. It may be appreciated that the computer readable program code may invoke system-level code or calls to other computer readable program codes residing on the one or more programmable components of the system (such as, the server arrangement, the ontological database and the synonym database) or other location to perform certain functions within or beyond the memory of the computing device. Furthermore, the computer readable program codes can be pre-configured and pre-integrated with an operating system of the computing device.

Optionally, the computer readable program code can generate a user interface to enable the entity to perform one or more tasks associated with the aforementioned system by using the computing device. The user interface includes a structured set of user interface elements rendered on a display screen of the computing device. Furthermore, the user interface (UI) is operable to interact with the user to convey graphical and/or textual information and receive input from the user. Specifically, the user interface (UI) used herein is a graphical user interface (GUI). Furthermore, the user interface (UI) elements refer to visual objects that have a size and position in user interface (UI). Examples of the visual objects may include Text blocks, labels, text boxes, input boxes, list boxes, lines, and images windows, dialog boxes, frames, panels, menus, buttons, icons, etc.

The computing device is configured to facilitate uploading the at least one research document. Specifically, the computer readable program code hosted by the computing device is operable to facilitate uploading the at least one research document. For example, the user interface generated by the computer readable program code may provide one or more visual objects such as input boxes (namely, input box with a file type or file upload control box and the like) to enable the entity to perform a task, namely, upload the at least one research document that may be stored in the local memory (such as a hard disk drive) of the computing device. In such example, the entity may provide an address of the location within the local memory where the at least one research document is stored. Furthermore, in such example, the computer readable program code may include a set of instruction or routine to temporally extract the files from the location within the local memory of the computing device.

As mentioned previously, the computing device is configured to facilitate acquiring informatory data related to the at least one research document. Specifically, the computer readable program code hosted by the computing device is operable to facilitate the acquiring of informatory data related to the at least one research document. Optionally, the informatory data includes metadata related to the at least one research document. The metadata related to the at least one research document can include a type associated with the uploaded research document, a domain associated with the uploaded research document. For example, the type associated with the uploaded research document may include the document format such as .doc, .ppt, pdf and the likes, furthermore, the type may describe the type of the research document such as publications document, patent document, white paper document and the like. Example of the domain associated with the uploaded research document may be medical, telecommunication, pharmaceutical and the likes. Optionally, the informatory data includes hypotheses of the at least one research document. The metadata related to the at least one research document can include a sentence and/or a collection of one or more terms to describe an idea or the motive of performing an experiment and/or research associated with the at least one research document. For example, a given at least one research document may be related to an experiment and/or research of determining an efficacy of a drug 'X' in treating a disease 'Y', therefore the hypotheses may be "The use of the drug X for treating the disease Y". Optionally, the informatory data includes statistical significance of the hypotheses. The statistical significance of the hypotheses refers to the data and readings determined or identified by the entity during performing the experiment and/or research that determines the value of the at least one research document. For example, the hypotheses associated to an experiment and/or research may be "The use of the drug X for treating the disease Y". In such example, the data and readings determined or identified by the entity during performing the experiment and/or research may describe that out of 5 cases the drug X was able to completely cure the disease Y in 4 cases, therefore the statistical significance of the hypotheses may be determined as 80%.

In an example, the computer readable program code may generate a user interface including one or more visual objects such as input boxes (namely, text input box or button or drop-down menu and the like) to enable the entity to input the informatory data related to the at least one research document, namely, the metadata related to the at least one research document, the hypotheses of the at least one research document, and the statistical significance of the hypotheses.

The computing device is configured to facilitate preprocessing the at least one research document to extract information included therein. The computer readable program code hosted by the computing device is operable to facilitate preprocessing the at least one research document to extract information included therein. Throughout the present disclosure, the term "preprocessing" relates to a routine of performing one or more data processing function for acquiring information from the at least one research document. In an example, preprocessing the at least one research document may include determining a format of the at least one research document and storing the information in the at least one research document in the preferred format. In such an example, if the format of the at least one research document is identified to be an image, an image to text extraction function may be performed to extract information included in the at least one research document, thereafter, the textual information may be stored in a metadata format within a memory associated with the computing device for further computational process to be performed by other components of the system (such as the server arrangement). In another example, if the format of the at least one research document is identified to be in tabular format, such as data stored in an XLS (Microsoft Excel) format, a function of extracting text from the XLS format is performed, and the extracted text is stored in a metadata format within a memory associated with the computing device for further computational process to be performed by other components of the system (such as the server arrangement). It will be appreciated that, the memory used to store the metadata format of the extracted information relates to a logical or physical portion of the memory of the computing device assigned to the computer readable program code hosted therein.

Optionally, the preprocessing includes extracting entire content pertaining to the at least one research document. The computer readable program code hosted in the computing device can be configured to extract entire content pertaining to the at least one research document in one instance. It will be appreciated that the content refers to the information used to form the at least one research document. For example, the computer readable program code may be configured to execute a function to access the content, namely, each and every word, terms, abbreviations, sentences included in the at least one research document in one instance. Thereafter, the extracted word, terms, abbreviations, sentences are stored and/or shared for further computational process to be performed by other components of the system (such as the server arrangement).

Alternatively, optionally, preprocessing includes extracting selective content pertaining to the at least one research document. The computer readable program code hosted in the computing device can be configured to extract content pertaining to the at least one research document selectively, i.e. the computer readable program code can be configured to extract a part of the content included in the at least one research document in one instance. For example, the at least one research document may include a first and a second page including content. In such example, the computer readable program code may be configured to extract contents from the first page of the at least one research document in a first instance, and the content from the second page in a second instance. In another example, the at least one research document may include one page including content distributed in plurality of paragraphs. In such example, the computer readable program code may be configured to extract contents from each of the plurality of paragraphs in a different instance.

As mentioned previously, the system comprises the data repository comprising the ontological database and the synonym database. Throughout the present disclosure, the term "data repository" relates to any device or combination of devices capable of storing, accessing and retrieving data, which may include any combination and number of data servers, databases, data storage devices and data storage media, in any standard, distributed or clustered environment. Furthermore, the data repository can recursively access, and store data related to various domains and related subject matter according to a set of communication protocols. The data repository is operable to perform various operations, including but not limited to, executing one or more applications, handling data access and the like. Optionally, the system is configured to include appropriate hardware and software for incorporating the data repository.

Throughout the present disclosure, the term "ontological database" refers to a databank that is configured to store and share information about a set of concepts related to a technical field (namely, a subject area, a technical domain and so forth), wherein said information is indicative of types of concepts, properties of the concepts and semantic inter-relationships between the concepts. Optionally, the ontological database is configured to store the information about the set of concepts in a structured manner. Additionally, optionally, the ontological database is configured to store information on how a certain concept in a certain technical field may be associated with one or more concepts in other field(s). Throughout the present disclosure, the term "synonym database" refers to a databank that is configured to store and share information about a set of synonyms related to one or more word and/or terms related to a technical field (namely, a subject area, a technical domain and so forth), wherein said information is indicative of types of word and/or terms that can be used while forming the summary. Optionally, the synonym database is configured to store the information about the set of synonyms in a structured manner.

In an embodiment, the ontological database and the synonym database is stored at the computing device. In another embodiment, the ontological database and the synonym database is stored at a database arrangement associated with the server arrangement. Optionally, the database arrangement comprises one or more databases.

The system comprises the server arrangement communicably coupled via one or more data communication networks with the computing device and the data repository. Throughout the present disclosure, the term "server arrangement" refers to an arrangement of one or more servers that includes one or more processors configured to perform various operations. Optionally, the server arrangement includes any arrangement of physical or virtual computational entities capable of performing the various operations. The term "one or more processors" may refer to one or more individual processors, processing devices and various elements associated with a processing device that may be shared by other processing devices. Additionally, the one or more individual processors, processing devices and elements are arranged in various architectures for responding to and processing the instructions that drive the aforesaid system.

Moreover, it will be appreciated that the server arrangement can be implemented by way of a single hardware server. The server arrangement can alternatively be implemented by way of a plurality of hardware servers operating in a parallel or distributed architecture. As an example, the server arrangement may include components such as memory, a processor, a network adapter and the like, to store and process information pertaining to the document and to communicate the processed information to other computing components, for example, such as a client device.

Throughout the present disclosure, the term "server" generally refers to a device executing an application, or program in a client/server relationship that responds to requests for information or services by another application, program, or device (namely, a computing device and the data repository) on the data communication network. Optionally, a given server is implemented by way of a device executing a computer program that provides various services (for example, such as a database service) to other devices, modules or apparatus.

Furthermore, throughout the present disclosure, the term "data communication network" generally relates to an arrangement of components that are configured to facilitate data communication between one or more electronic devices and/or databases, namely the server arrangement, the data repository and the computing device. Furthermore, the data communication network may include, but is not limited to, one or more peer-to-peer network, a hybrid peer-to-peer network, local area networks (LANs), radio access networks (RANs), metropolitan area networks (MANS), wide area networks (WANs), all or a portion of a public network such as the global computer network known as the Internet, a private network, a cellular network and any other communication system or systems at one or more locations.

Optionally, the data communication network includes wired or wireless communication that can be carried out via any number of known protocols, including, but not limited to, Internet Protocol (IP), Wireless Access Protocol (WAP), Frame Relay, or Asynchronous Transfer Mode (ATM). Moreover, any other suitable protocols using voice, video, data, or combinations thereof, can also be employed. Furthermore, the system can be implemented using TCP/IP communications protocols, IPX, Appletalk, IP-6, NetBIOS, OSI, any tunneling protocol (e.g. IPsec, SSH), or any number of existing or future protocols.

As mentioned previously, the server arrangement configured to acquire, from the computing device, the information included in the at least one research document. The application or program executed in the server arrangement is configured to acquire the information included in the at least one research document from the computing device. Optionally, the server arrangement is configured to trigger the application or program that can generate a request for the computer program code hosted in the computing device to provide the extracted information from the at least one research document upon preprocessing.

Optionally, the application or program configured to acquire, the information from the computing device, can acquire the entire content pertaining to the at least one research document in one instance. For example, the entire content pertaining to the at least one research document includes words, terms, abbreviations, sentences and the like. In such example, the application or program acquires each and every word, terms, abbreviations, sentences of the at least one research document within a single session.

It will be appreciated that, the term "session" refers to an active connection between two elements of the system (e.g., between the server arrangement and the computing device, or the application of the server arrangement and the computer program code of the computing device) via the data communication network.

Alternatively, optionally, the application or program configured to acquire, the information from the computing device, can acquire the content pertaining to the at least one research document in plurality of instances. The application or program can acquire the content pertaining to the at least one research document selectively. For example, the at least one research document may include two pages of content. In such example, the application or program may be configured to acquire the contents of the two pages one after another.

The server arrangement configured to analyze the information using the ontological database and the synonym database to identify the set of keywords corresponding to the at least one research document. The analysis of the information includes receiving a plurality of words from the ontology database. It will be appreciated that, the ontology database comprises a plurality of nodes corresponding to the specific subject-matter, wherein the specific subject-matter is the plurality of words. Optionally, the plurality of words is received in succession by the server arrangement.

Furthermore, the application or program executed in the server arrangement is configured to compare each of the plurality of words with the information of the at least one research document, to identify common words from the ontology database that appear within the at least one research document. The plurality of words received from the ontology database is compared with the information fetched from the at least one research document. Moreover, common words that appear in the ontology database and the information of the at least one research document are identified. In an example, a research document comprises of the words "the", "top", "drugs", "for" and "cancer". It will be appreciated that the ontology database is a research-based database and therefore, the ontology database will not comprise of the words such as "the", "top", "for" and so forth. The application or program executed in the server arrangement will fetch words from the ontology database, compare the words with the fetched information of the research document and identify the common words i.e. "drugs" and "cancer". Optionally, n-gram model is used for the comparison of the plurality of words received from the ontology database and the fetched information of the at least one research document. It will be appreciated that the n-gram model relates to a contiguous sequence of 'n' items from a given plurality of words (such as a sentence), wherein 'n' represents number of words within each of the sentence. In this regard, the sentence having one word is referred as unigram or one-gram, the sentence having two words are referred as bigram or two-gram, the sentence having three words are referred as trigram or three-gram. Similarly, based on the number of the words, the plurality of words is referred as four-gram, five-gram, and so on. In an example, the plurality of words generated may be "top drugs for cancer", "top drugs for", "drugs for cancer", "top drugs", "drugs for", "for cancer", "top", "drugs", "for" and "cancer". In such an example, the plurality of words "top drugs for cancer" is the four-gram. Similarly, the plurality of words "top drugs for", and "drugs for cancer" could be the trigram or three-gram, the plurality of words "top drugs", "drugs for", and "for cancer" could be bigram or two-gram and the plurality of words "top", "drugs", "for" and "cancer" could be unigram or one-gram.

Furthermore, the application or program executed in the server arrangement is operable to receive from the synonym database, a plurality of synonymous words corresponding to the common words. The common words of the ontology database and the at least one research document that are identified are looked up in the synonym database by the database arrangement. Moreover, the synonymous words corresponding to the identified common words are received by the database arrangement from the synonym database. In an example, a plurality of words of the ontology database is compared with a research document and common words are identified. Suppose the identified common words are "cancer", "blood", "skin" and so forth. The synonyms corresponding to the word "cancer" i.e. "tumor", "malignance", "carcinoma" and so forth are received from the synonym database. Moreover, the synonyms corresponding to the word "blood" i.e. "plasma", "body fluid" and so forth are received from the synonym database. Moreover, the synonyms corresponding to the word "skin" i.e. "membrane", "epidermis", "dermis" and so forth are received from the synonym database.

Optionally, the application or program executed in the server arrangement is operable to identify the common words and receive the plurality of synonymous words corresponding to the common words in a sequential manner. Alternatively, the application or program executed in the server arrangement is operable to identify the common words and receive the plurality of synonymous words corresponding to the common words in a simultaneous manner.

Furthermore, the application or program executed in the server arrangement is operable to generate a set of keywords comprising the common words and the plurality of synonymous words corresponding to the common words. The application or program executed in the server arrangement combines the common words received from the ontology database and the synonymous words corresponding to the received common words from the synonym database and generates a list of the combined words i.e. the set of keywords. In an example, the common words identified from a research document may be "skin", "tumor" and "disease". The corresponding synonyms of the word "skin" are "membrane", "epidermis" and "dermis", the corresponding synonyms of the word "tumor" are "malignance", "carcinoma" and "cancer" and the corresponding synonyms of the word "disease" are "illness", "sickness" and "ill health". The application or program executed in the server arrangement will therefore, generate a set of keywords comprising the words "skin", "tumor", "disease", "membrane", "epidermis", "dermis", "malignance", "carcinoma", "cancer", "illness", "sickness" and "ill health".

As mentioned previously, the server arrangement is configured to assign the first score to each of the keywords based on the document-centric property. Throughout the present disclosure, the term "first score" relates to a measure of entailment of a given keyword within the at least one research document. The first score is a numeric value that is assigned to each keyword of the set of keywords identified from the at least one research document. Furthermore, the first score to each of the keywords is assigned by the application or program executed in the server arrangement based on a document-centric property. The document-centric property of a given keyword of the set of keywords relates to the entailment of a given keyword within the at least one research document.

Optionally, the document-centric property of a keyword includes at least one of: a location of the keyword in the at least one research document, an occurrence-frequency of the keyword in the at least one research document. The location of the keyword in the at least one research document refers to the property of the keywords that describes the position of the keyword within the at least one research document. For example, a keyword "G" may be present in the top portion (starting) of the at least one research document or at the bottom portion (ending) of the at least one research document, and a keyword "K" may be present in the middle portion of the at least one research document. In such example, the keyword "G" may be assigned a higher value of document-centric property.

Furthermore, the occurrence-frequency of the keyword refers to the property of the keywords that describes the measure of the occurrence of the keywords within the at least one research document. For example, a keyword "H" occurs 5 times in the at least one research document, and the keyword "I" occurs 3 times in the at least one research document. In such an example, the keyword "H" may be assigned a higher value of document-centric property.

Optionally, the server arrangement is configured to assign the first score to each of the keywords further based upon the informatory data. The application or program executed in the server arrangement is configured to consider the informatory data related to the at least one research document of a keyword to determine the first score to each of the keywords. In an example, if a given keyword of the identified set of keywords has been mentioned by the entity while providing the informatory data, the application or program executed in the server arrangement may be configured to assign a higher score to the keyword.

Optionally, the server arrangement is configured to assign the first score to each of the keywords further based upon a popularity index of a keyword. The application or program executed in the server arrangement is configured to consider the informatory data related to the popularity index of a keyword to determine the first score to each of the keywords. The popularity index of a keyword refers to a metric used in quantifying the number of times the keyword has been included in a web-activity, such as in web-searching, describing a subject matter on a website, and the like. In an example, the keyword may be determined as a highly mentioned key word for searching a specific subject matter on the web, or the keyword may be determined as a term that is being mentioned in plurality of documents to describe a specific subject matter on the web that is related to the at least one research document.

In one embodiment, the first score of the each of the keywords can be a summation of the values assigned to each of the keywords based on the informatory data, the popularity index of the keyword, the location of the keyword in the at least one research document, and the occurrence-frequency of the keyword in the at least one research document.

As mentioned previously, the server arrangement is configured to assign the second score to one or more relationships between the keywords based on the relationship-centric property. Specifically, each of the keywords of the set of keywords corresponding to the at least one research document has one or more relationships with other keywords of the identified set of keywords. Furthermore, the second score to the one or more relationships between the keywords is assigned by the application or program based on the relationship-centric property. Throughout the present disclosure, the term "second score" relates to measure of a type of relation of a given keyword with another keyword in the set of keywords identified from the at least one research document. The second score is a numeric value that is assigned to a given relationship. The relationship-centric property relates as to how a keyword of the set of keywords is related to another keyword of the set of keywords.

Optionally, assigning the second score to one or more relationships between the keywords, based on the relationship-centric property, includes identifying one or more relationships between the keywords, identifying semantics of the one or more relationships in the at least one research document, and analyzing world knowledge to determine a cognizance-index of the semantics of each of the one or more relationships. The relationships between the keywords relates to an association between the one or more generated set of keywords, wherein the association can be a technical association, a logical association, a scientific association and so forth. In an example, a keyword "drug" can be associated with a second keyword "disease" in several ways. The "drug" can be effective in treating the "disease", the "drug" can be ineffective in treating the "disease", the "drug" can aggravate growth of the "disease" and so forth. The associations between the keywords "drug" and "disease" such as "effective in treating", "ineffective in treating" or "aggravate growth" can be the relationships between the two keywords. Optionally, parsing techniques can be implemented to identify the relationships between the generated set of keywords. The term "parsing techniques" as used throughout the present disclosure, relates to an analysis performed by the server arrangement, wherein the server arrangement analyses the relationship between the generated set of keywords, resulting in a hierarchical structure (such as a hierarchical tree). It will be appreciated that the hierarchical structure determines the publicly-available relationships present between the generated set of keywords. It will be further appreciated that the generated set of keywords can have one or more relationships with each other. Optionally, the parsing technique used to identify the relationships between the generated set of keywords can be a Frame parsing technique.

Furthermore, identifying the semantics of the one or more relationships in the at least one research document refers to identifying the nature of the relationships between the keywords. For example, a keyword is drug "X" that is related to another keyword which is a disease "Y". In such example, the relationship of the keyword "X" to "Y" is that "X" cures "Y". Furthermore, in such example, identifying the semantics of the relationships between the keyword "X" and "Y" refers to understanding that "X" cures "Y".

Analyzing world knowledge to determine the cognizance-index of the semantics of each of the one or more relationships relates to determining and/or understanding information related to each of the one or more relationships from the ontology database and thereafter, determining the cognizance-index. In an example, the at least one research document may mention that the drug "X" has a 90% chance of curing the disease "Y". In such an example, the world knowledge of the relationship between the drug "X" and the disease "Y" (i.e. the information related to the relationship between "X" and "Y" from the ontology database) describes that "X" cures "Y" and the drug "X" has a 60% chance of curing the disease "Y". Therefore, in such example, the cognizance-index of the relationship between "X" and "Y" will be low, i.e. the awareness of the relationship between the "X" and "Y" is known. In another example, if the world knowledge of the relationship between the drug "X" and the disease "Y" describes that the drug "X" does not cure "Y" then the cognizance-index of the relationship between "X" and "Y" will be high, i.e. the awareness of the relationship between "X" and "Y", that the drug "X" can be used to cure the disease "Y" is not known.

The server arrangement is configured to generate the summary for the at least one research document. The application or program executed in the server arrangement is configured to generate the summary for the at least one research document. Furthermore, the application or program is configured to generate the summary in a structured form. For example, the summary may include one or more parts or lines that may be of different significance.

As mentioned previously, the summary comprises the first portion generated based upon the informatory data. The first portion refers to the starting part of the summary. For example, the first portion of the summary can be a collection of one or more keywords, terms or sentences mentioned by the entity as the informatory data via the user interface. Optionally, the first portion is the hypotheses of the experiment mentioned by the entity via the user interface of the computing device. For example, the entity may use the user interface provided by the computing device to enter the hypotheses of the at least one research document as "The use of the drug X for treating the disease Y". In such an instance, the application or program is configured to use the hypotheses provided by the entity as the first portion of the summary. In operation, the application or program constructing the summary is configured to use the hypotheses provided by the entity as the first line of the summary.

The summary comprises the second portion generated based on the keywords in the one or more relationships having the second score below the predefined threshold. The application or program executed in the server arrangement is configured to use keywords having one or more relationships that includes score lesser that the predefined value. The predefined threshold refers to a definite measurement of the second score assigned to one or more relationships between the keywords. Furthermore, the application or the program is configured to consider the keywords with the one or more relationships having the second score below the predefined threshold.

In operation, the application or the program is configured to identify at least one sentence in the information provided by the computer program code of the computing device. Furthermore, the identified at least one sentence includes a maximum number of keywords with one or more relationships having the second score below the predefined threshold. In an example, a first sentence identified from information provided by a computer program code of a computing device may include 4 keywords with one or more relationships having a second score below a predefined threshold. Furthermore, a second sentence may be identified from the information provided by the computer program code of the computing device to include 2 keywords with one or more relationships having the second score below the predefined threshold. In such an instance, the application or program executed in a server arrangement is configured to select the first sentence to form a second portion of a summary.

The summary comprises the third portion generated, using the machine learning algorithm, based on the first score of the keywords. Throughout the present disclosure, the term "machine learning algorithm" relates to a collection or set of instructions executable by a digital system (namely, the server arrangement) so as to configure the server arrangement to perform a task. The task to be performed by the server arrangement relates to a mechanism or computationally intelligent task that combines knowledge, techniques, and methodologies for controlling a bot or other elements within the system. Furthermore, machine learning algorithm is configured to apply knowledge and can adapt itself and learn to do better in changing environments. Additionally, employing any computationally intelligent technique, the machine learning algorithm is operable to adapt to unknown or changing environment for better performance. The machine learning algorithm includes fuzzy logic engines, decision-making engines, preset targeting accuracy levels, and/or programmatically intelligent software.

The machine learning algorithm is configured to construct one or more sentences using the keywords. Furthermore, the machine learning algorithm uses the keywords based on the first score of the keywords, i.e. the machine learning algorithm is configured to consider the popularity index of a given keyword, location of the given keyword in the at least one research document, occurrence-frequency of the given keyword in the at least one research document to determine how and where to use the keywords to form the sentence.

Optionally, the machine learning algorithm is implemented as a natural language generator. The natural language generator is a computer-based product that is operable to carry out one or more function to construct sentences that can be used to be positioned after the second portion of the summary. Furthermore, the natural language generator can be configured to use the keywords with the higher first score to form the sentences for the third portion of the summary.

Optionally, the machine learning algorithm can be used to construct the first, second and the third portion of the summary and arrange them in a sequence, i.e. the first portion may be arranged at the starting of the summary followed by the second portion and thereafter the third portion. Optionally, the summary may include 5-6 lines or 60-70 words.

In an embodiment, the system can be implemented as a digital platform wherein a summary of the at least one research document can be machine generated using relevant keywords corresponding to the at least one research document, and metadata provided by the entity generating the at least one research document. Furthermore, the digital platform generates the summary without acquiring the at least one research document, i.e. the at least one research document is not transmitted to the digital platform from the storage location (such as a local memory of a computer used by the entity to store the least one research document). Additionally, the digital platform can be configured to facilitate communication with a third party (such as an interested researcher, organization and the like) that can be interested in procuring the at least one research document. Furthermore, the communication with the third party includes enabling the third party to perform a search using key-terms and providing the summary of the at least one research document in an event wherein the key-terms used for the search matches the keywords used in the summary. Subsequently, facilitating a financial transaction of a predefined amount between the third party and the entity for acquiring the at least one research document of the entity. Thereafter, providing the third-party access to the at least one research document upon receiving the predefined amount by the entity.

Furthermore, the system includes an architecture that can monitor and execute one or more process-instances. Examples of process-instances can include preprocessing the at least one research document to extract information from therein, transmitting the extracted information to the server arrangement, identifying keywords from the at least one research document and the like. Additionally, the architecture can monitor and execute one or more process-instances occurring between the computing device and the server arrangement, the entity and the third party, or the server arrangement and the third party. It will be appreciated that, the computing device, the server arrangement, and the third party may or may not trust each other. In an example the architecture can be blockchain platforms, such as Hyperledger®, Stratis STRAT®, Ethereum® and the likes.

Moreover, the present description also relates to the method as described above. The various embodiments and variants disclosed above apply mutatis mutandis to the method.

Optionally, in the method, preprocessing includes extracting entire content pertaining to the at least one research document.

Optionally, in the method, preprocessing includes extracting selective content pertaining to the at least one research document.

Optionally, the server arrangement is configured to assign the first score to each of the keywords further based upon at least one of: the informatory data, a popularity index of a keyword.

Optionally, the document-centric property of a keyword includes at least one of: a location of the keyword in the at least one research document, an occurrence-frequency of the keyword in the at least one research document.

Optionally, assigning the second score to one or more relationships between the keywords, based on the relationship-centric property, includes:
identifying one or more relationships between the keywords,
identifying semantics of the one or more relationships in the at least one research document, and
analyzing world knowledge to determine a cognizance-index of the semantics of each of the one or more relationships.

Optionally, the informatory data includes:
metadata related to the at least one research document,
hypotheses of the at least one research document, and
statistical significance of the hypotheses.

DETAILED DESCRIPTION OF THE DRAWINGS

Figure 1:
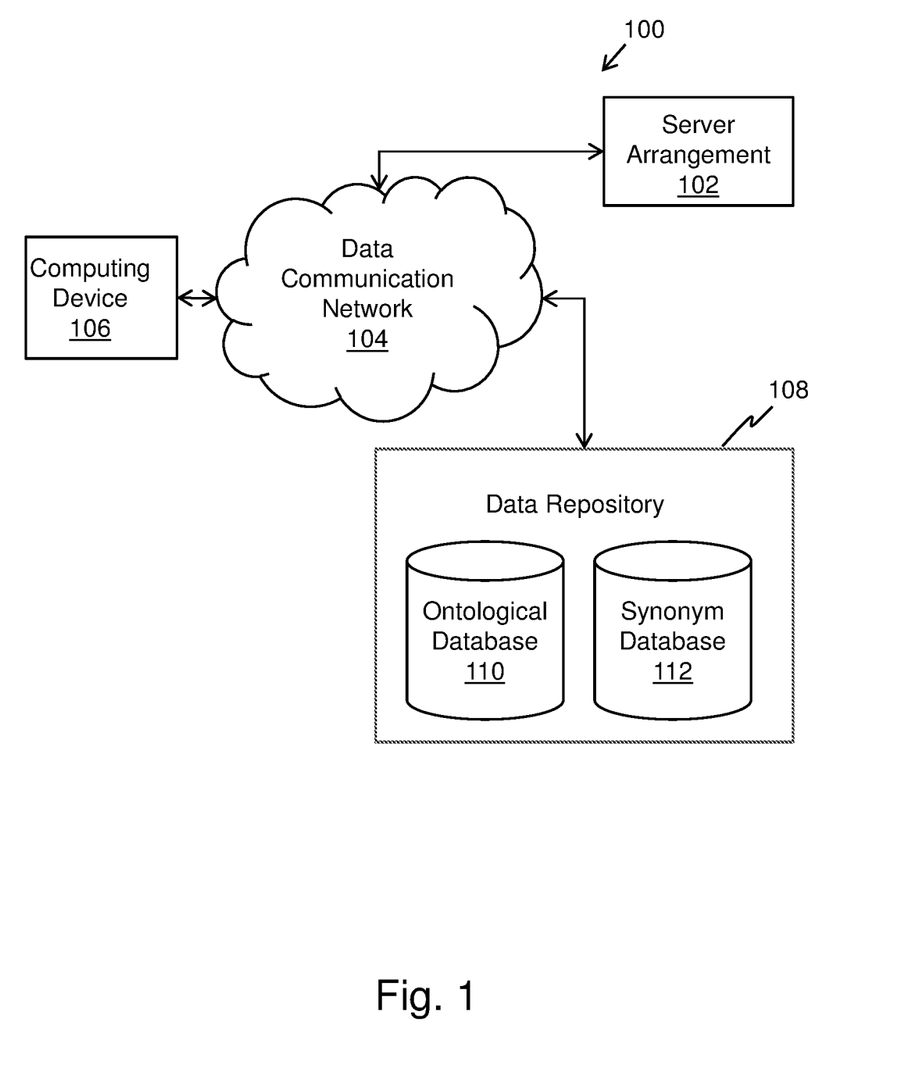
FIG. 1 is an illustration of a block diagram of a system for generating a summary of at least one research document, in accordance with an embodiment of the present disclosure.

Referring to FIG. 1, there is provided a block diagram of a system 100 for generating a summary of at least one research document, in accordance with an embodiment of the present disclosure. The system 100 comprises a server arrangement 102 communicably coupled via one or more data communication networks 104, with the computing device 106 and the data repository 108. Moreover, the data repository 108 comprises an ontological database 110 and a synonym database 112.

FIG. 1 is merely an example, which should not unduly limit the scope of the claims herein. It is to be understood that the specific designation for the system 100 is provided as an example and is not to be construed as limiting the system 100 to specific numbers, types, or arrangements of server arrangements, client devices, data communication networks and ontological databanks. A person skilled in the art will recognize many variations, alternatives, and modifications of embodiments of the present disclosure.

Figure 2:
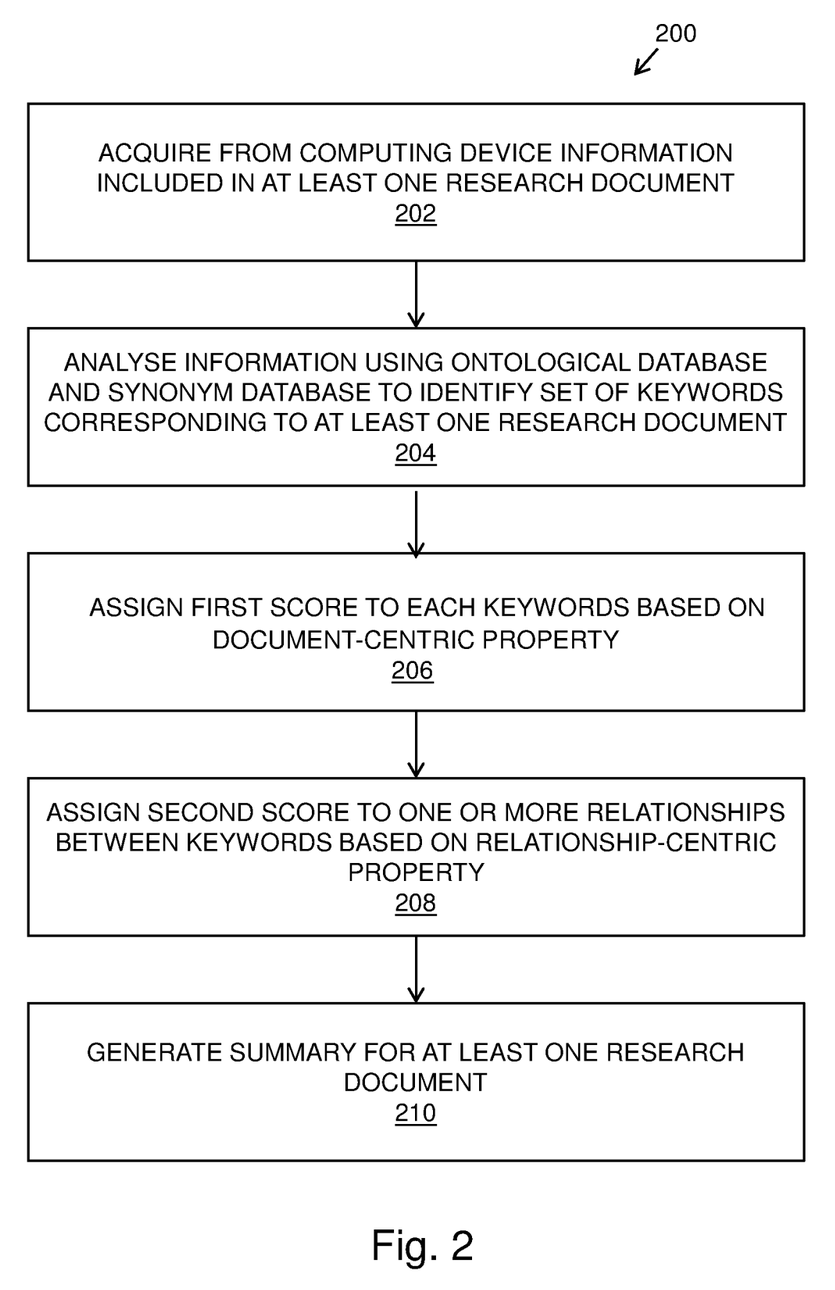
FIG. 2 is an illustration of steps of a method for (of) generating a summary of at least one research document, in accordance with an embodiment of the present disclosure.

Referring to FIG. 2, there are illustrated therein steps of a method for (of) generating the summary of the at least one research document, in accordance with an embodiment of the present disclosure. The method is depicted as a collection of steps in a logical flow diagram, which represents a sequence of steps that can be implemented in hardware, software, or a combination thereof, for example as aforementioned.

At a step 202, information included in the at least one research document is acquired from the computing device.

At a step 204, the information is analysed using the ontological database and the synonym database to identify a set of keywords corresponding to the at least one research document At a step 206, a first score is assigned to each of the keywords based on a document-centric property At a step 208, a second score is assigned to one or more relationships between the keywords based on a relationship-centric property.

At a step 210, summary is generated for the at least one research document.

The steps 202 to 210 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system for generating a summary of at least one research document, the system comprising:
   a computing device associated with an entity, wherein the computing device, comprises a computer readable program code, configured to:
     upload the at least one research document,
     acquire informatory data related to the at least one research document, and
     preprocess the at least one research document to extract information included;
   a data repository comprising an ontological database and a synonym database; and
   a server arrangement communicably coupled via one or more data communication networks with the computing device and the data repository, the server arrangement configured to:
     acquire, from the computing device, the information included in the at least one research document,
     analyze, the information using the ontological database and the synonym database to identify a set of keywords corresponding to the at least one research document,
     assign a first score to each of the keywords based on a document-centric property, the informatory data and a popularity index of each of the keyword, wherein the popularity index of each of the keyword is a metric for quantifying number of times the keyword is included in a web-activity, and wherein the document-centric property of a keyword includes at least one of: a location of the keyword in the at least one research document, an occurrence-frequency of the keyword in the at least one research document,
     assign a second score to one or more relationships between the keywords based on a relationship-centric property, wherein assigning the second score to one or more relationships between the keywords, based on the relationship-centric property, includes:
       identifying one or more relationships between the keywords,
       identifying semantics of the one or more relationships in the at least one research document, and
       analyzing world knowledge to determine a cognizance-index of the semantics of each of the one or more relationships, wherein the cognizance-index denotes an awareness of the one or more relationships, and
     generate the summary for the at least one research document, wherein the summary comprises:
       a first portion generated based upon the informatory data,
       a second portion generated based on the keywords in the one or more relationships having the second score below a predefined threshold, and
       a third portion generated, using a machine learning algorithm, based on the first score of the keywords.

2. The system according to the claim 1, wherein preprocessing includes extracting entire content pertaining to the at least one research document.

3. The system according to the claim 1, wherein preprocessing includes extracting selective content pertaining to the at least one research document.

4. The system according to the claim 1, wherein the informatory data includes:
   metadata related to the at least one research document,
   hypotheses of the at least one research document, and
   statistical significance of the hypotheses.

5. The system according to the claim 1, wherein the machine learning algorithm is implemented as a natural language generator.

6. A method for generating a summary of at least one research document, wherein the method is implemented using a system comprising:
   a computing device associated with an entity, wherein the computing device, comprises a computer readable program code, configured to:
     upload the at least one research document,
     acquire informatory data related to the at least one research document, and
     preprocess the at least one research document to extract information;
   a data repository comprising an ontological database and a synonym database; and
   a server arrangement communicably coupled via one or more data communication networks with the computing device and the data repository, wherein the method comprises:
     acquiring, from the computing device, the information included in the at least one research document,
     analyzing, the information using the ontological database and the synonym database to identify a set of keywords corresponding to the at least one research document,
     assigning a first score to each of the keywords based on a document-centric property, the informatory data and a popularity index of each of the keyword, wherein the popularity index of each of the keyword is a metric for quantifying number of times the keyword is included in a web-activity, and wherein the document-centric property of a keyword includes at least one of: a location of the keyword in the at least one research document, an occurrence-frequency of the keyword in the at least one research document,
     assigning a second score to one or more relationships between the keywords based on a relationship-centric property, wherein assigning the second score to one or more relationships between the keywords, based on the relationship-centric property, includes:
       identifying one or more relationships between the keywords,
       identifying semantics of the one or more relationships in the at least one research document, and
       analyzing world knowledge to determine a cognizance-index of the semantics of each of the one or more relationship, wherein the cognizance-index denotes an awareness of the one or more relationships, and
     generating the summary for the at least one research document, wherein the summary comprises:
       a first portion generated based upon the informatory data,
       a second portion generated based on the keywords in the one or more relationships having the second score below a predefined threshold, and a third portion generated, using a machine learning algorithm, based on the first score of the keywords.

7. The method according to the claim 6, wherein preprocessing includes extracting entire content pertaining to the at least one research document.

8. The method according to the claim 6, wherein preprocessing includes extracting selective content pertaining to the at least one research document.

9. The method according to the claim 6, wherein the informatory data includes:
   metadata related to the at least one research document,
   hypotheses of the at least one research document, and
   statistical significance of the hypotheses.

\* \* \* \* \*